July 14, 1942.   C. B. WILLIAMS, JR   2,289,615
TREATING AND HANDLING PLASTIC SHEETING
Filed April 29, 1940    4 Sheets-Sheet 1
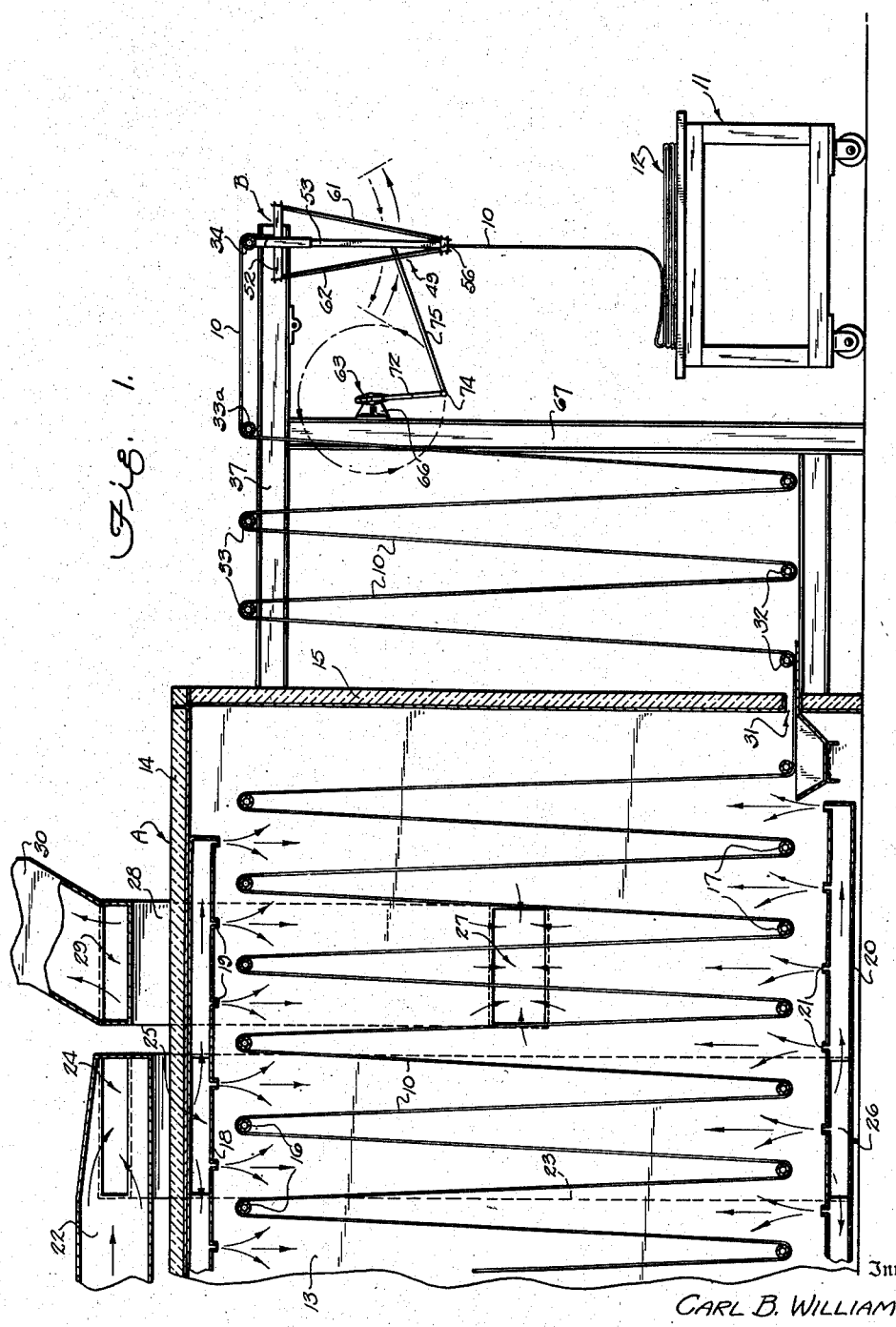
Inventor
CARL B. WILLIAMS JR.
By
Frank Fraser
Attorney

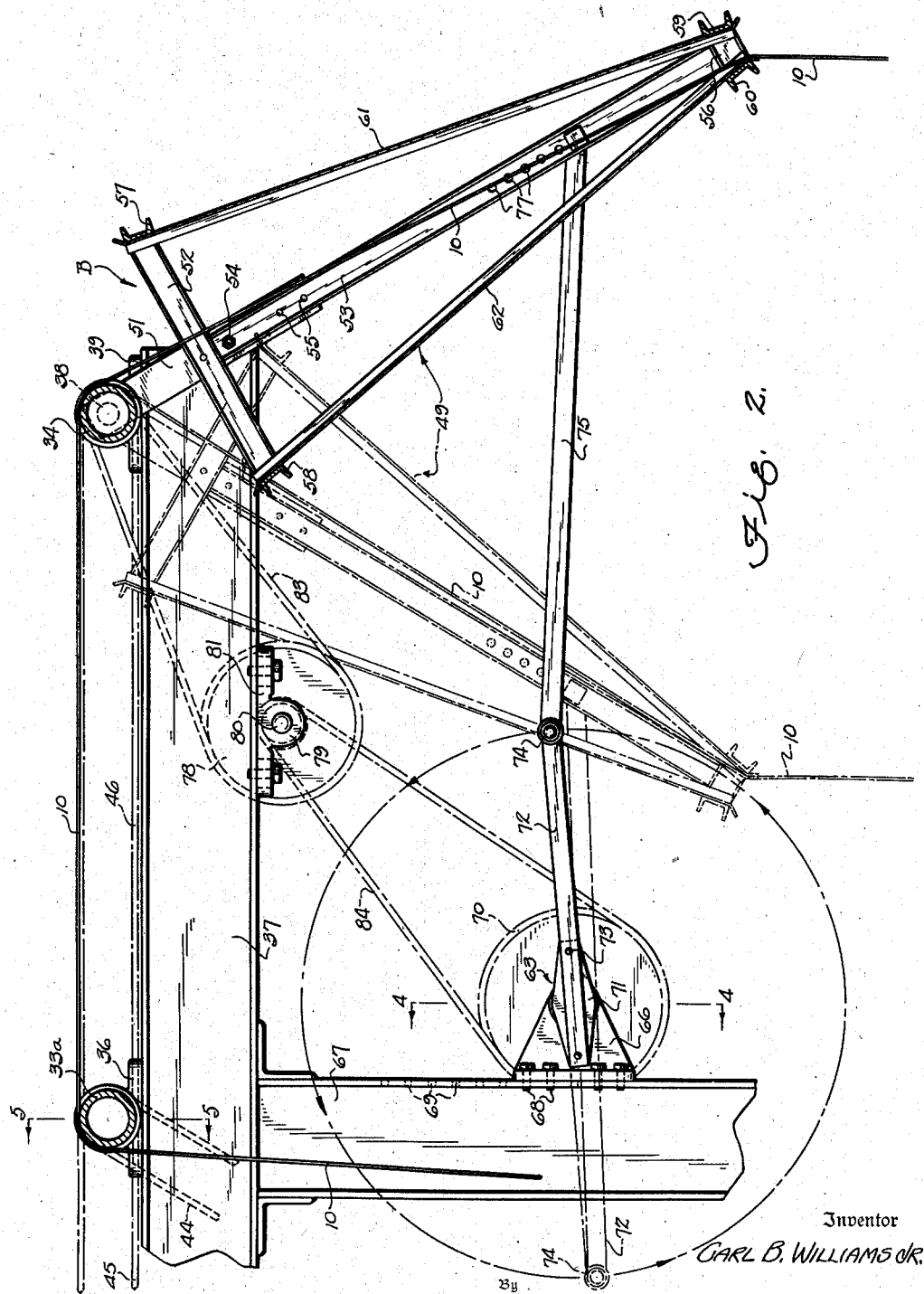

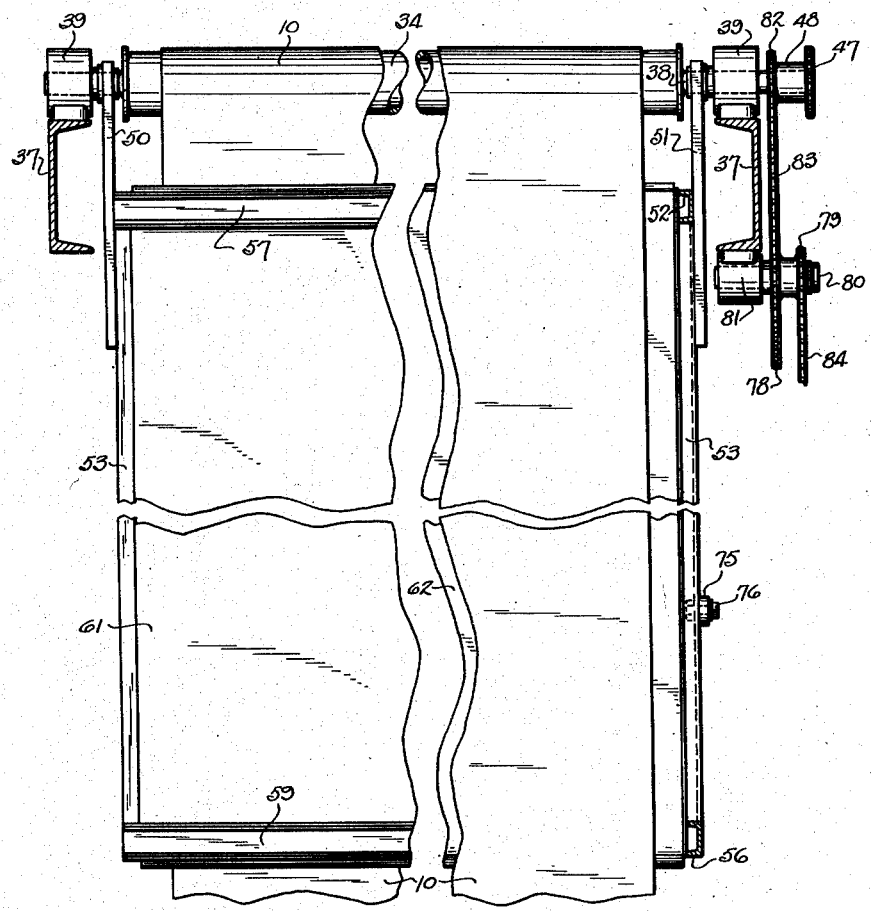

Patented July 14, 1942

2,289,615

UNITED STATES PATENT OFFICE 2,289,615

TREATING AND HANDLING PLASTIC SHEETING

Carl B. Williams, Jr., Toledo, Ohio, assignor to Libbey-Owens-Ford Glass Company, Toledo, Ohio, a corporation of Ohio Application April 29, 1940, Serial No. 332,409

4 Claims. (Cl. 270—79)

The present invention relates broadly to the treatment and handling of plastic sheeting and more particularly to the sheet plastic used in the making of laminated safety glass.

In the manufacture of laminated safety glass, two sheets of glass and a sheet of transparent plastic material interposed therebetween are bonded together to form a composite structure. The plastic material preferably consists of a polyvinyl acetal resin such as Vinylite and the plastic is ordinarily received by the safety glass manufacturer in relatively large rolls upon which it is wound in the form of a continuous sheet or ribbon. When received by the safety glass manufacturer, the resin sheeting has a relatively greater moisture content than is desirable in the plastic when it is bonded with the glass sheets to form safety glass. In order to meet this difficulty, it has been found necessary to condition the resin plastic whereby to reduce the moisture content thereof to the desired point before assembly with the glass sheets. After the plastic sheeting has been properly conditioned, it is ordinarily placed in a storage room having a predetermined temperature and humidity, and allowed to remain therein until it is ready for use whereupon it is cut into sheets or sections of the desired shape and size and united with the glass sheets to form safety glass.

In accordance with this invention, improved means is provided for effecting the desired conditioning of the plastic sheeting by reducing the moisture content thereof to the desired point together with novel means for receiving the plastic sheeting from the conditioning means and laying it in folds upon a suitable support. The folded plastic sheeting can then be transferred to a storage room having a predetermined temperature and humidity and allowed to remain therein until it is to be used in the manufacture of safety glass. The plastic folding and laying means operates automatically to receive the sheeting from the conditioning means and lay it upon the support without stretching. Likewise, the laying of the conditioned plastic sheeting in folds upon the support greatly facilitates the subsequent feeding of the plastic to a cutting press wherein it is cut to the shape and size of the glass sheets with which it is to be assembled.

It has been heretofore customary for the plastic sheeting, after being conditioned, to be wound up in a large roll until ready for use. However, such a procedure is objectionable in that when the plastic is subsequently unwound from the roll and fed to the cutting press an undesirable stretching of the plastic occurs. Manifestly, if the plastic is cut to the exact size while in a stretched condition it will not be of the desired size when it returns to normal position after cutting. In an effort to overcome this disadvantage, the plastic has been cut oversize, but such a practice is not entirely satisfactory as the stretching of the plastic is not always uniform. However, the laying of the plastic sheeting in loose horizontal folds according to this invention permits a uniform feeding of the plastic to the cutting press without stretching due to less weight of plastic or drag on the feeding means. Consequently, it is possible to cut the plastic more nearly the exact size desired. Furthermore, the laying of the plastic sheeting in loose folds, renders possible the maintaining of the plastic in a uniform condition during storage.

Other objects and advantages of the invention will become more apparent during the course of the following description when taken in connection with the accompanying drawings.

In the drawings, wherein like numerals are employed to designate like parts throughout the same:

Fig. 1 is a vertical longitudinal section through a portion of the plastic conditioning means and showing in side elevation the folding and laying means associated therewith;

Fig. 2 is an enlarged side elevation of the folding and laying means;

Fig. 3 is a front view of the folding and laying means partly in section and partly in elevation;

Fig. 4 is a detail vertical section taken substantially on line 4—4 of Fig. 2;

Fig. 5 is a detail vertical section taken substantially on line 5—5 of Fig. 2.

Figure 6:
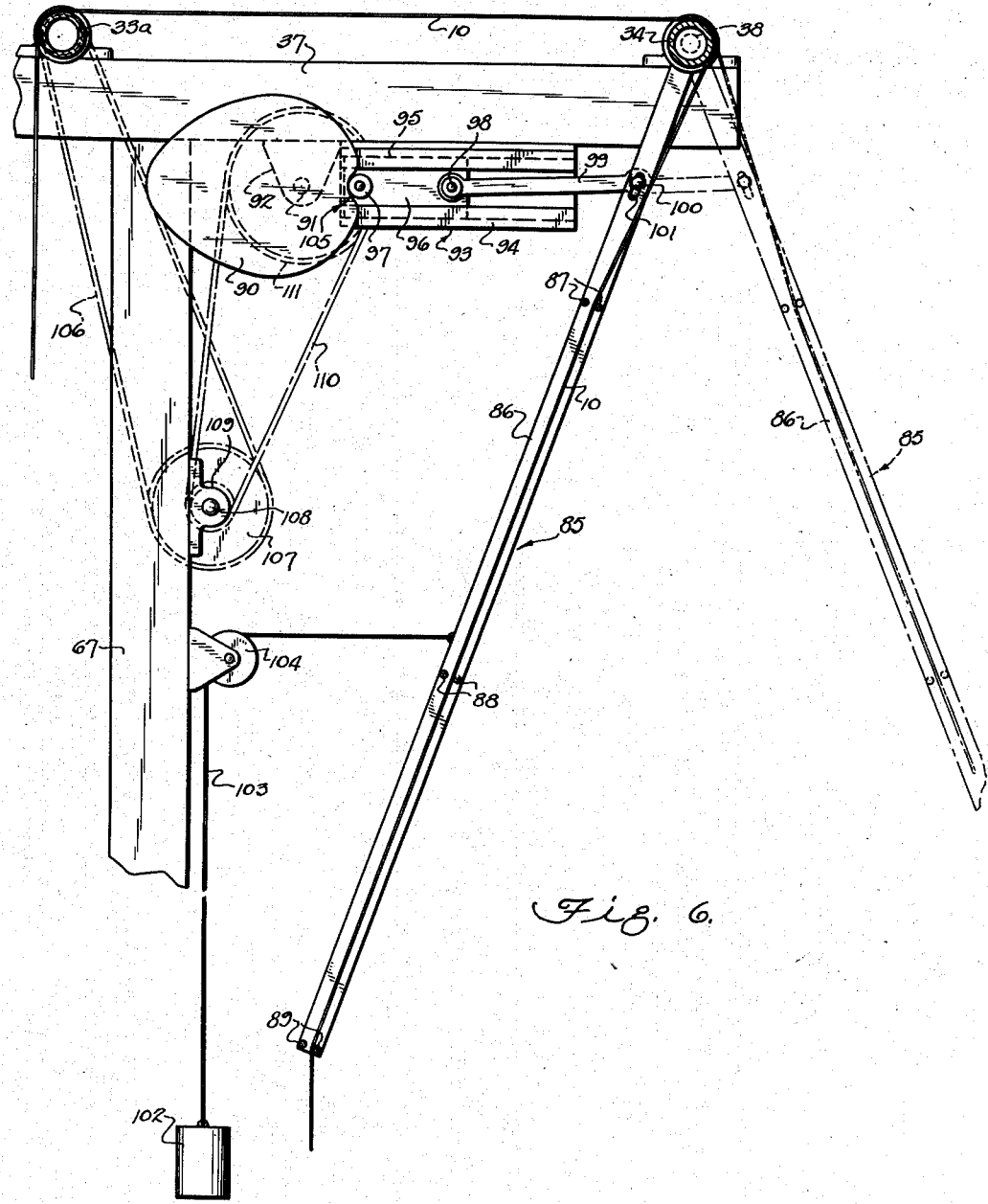
Fig. 6 is a side elevation showing a modified type of folding and laying means.

Referring now to the drawings, the letter A designates in its entirety the means for conditioning the plastic sheeting 10 and B the means for receiving the plastic sheeting from the conditioning means A and laying it in folds as indicated at 12 upon a suitable horizontal support 11 which may be in the form of a movable table or carriage. The conditioning means A comprises a drying chamber or oven of elongated tunnel formation including opposite side walls 13, a top wall 14, and end walls 15. The exit end portion only of the drying oven is illustrated in Fig. 1. Mounted within the oven, adjacent the top thereof, are a series of horizontally aligned transverse rolls 16, while a second series of horizontally aligned transverse rolls 17 are located within the oven adjacent the bottom thereof. The rolls 16 and 17 are disposed in vertical staggered relation with respect to one another, and the plastic sheeting 10 is trained alternately over the upper and lower rolls to provide a plurality of substantially vertical flights.

To properly condition the plastic sheeting, heated dry air is continuously circulated through the oven to absorb the desired amount of moisture from the plastic sheeting as it travels therethrough. For this purpose, there is arranged along the top 14 of the oven a metallic casing 18 having openings 19 therein through which the heated dry air is fed downwardly into the oven between the rolls 16 and adjacent upwardly diverging flights of plastic sheeting 10. Arranged at the bottom of the oven is a similar metallic casing 20 having openings 21 therein for directing heated dry air upwardly between the rolls 17 adjacent downwardly diverging flights of plastic sheeting. The heated dry air is delivered to the casings 18 and 20 from a horizontal supply conduit 22 and vertical duct 23. The supply conduit 22 is in communication with the upper end of duct 23 by an opening 24, while said duct 23 communicates with the upper casing 18 through an inlet opening 25, and with the lower casing 20 through an inlet opening 26.

The heated dry air entering the metallic casings 18 and 20 from the supply conduit 22 will flow therethrough and be discharged into the oven through the openings 19 and 21 respectively. After circulating within the oven, the air is discharged therefrom at one or more points through outlet openings 27 in the opposite side walls 13 of the oven. These outlet openings communicate with vertical ducts 28 communicating at their upper ends through openings 29 with a second conduit 30. The air is delivered from the conduit 30 to suitable apparatus (not shown) which removes the moisture therefrom and redelivers it to the intake conduit 22 to be again circulated through the oven. Of course, the air can be introduced into the casings 18 and 20 at a plurality of points longitudinally of the oven if desired to obtain a more uniform circulation and distribution of air within said oven.

After passing through the oven, the conditioned plastic sheeting 10 emerges therefrom through an outlet slot 31 in the front wall 15 thereof and is then trained alternately about the lower and upper rolls 32 and 33 respectively arranged outwardly of the oven. From the last upper roll 33a, the plastic sheeting 10 passes horizontally and then downwardly over a roll 34 to the folding and laying apparatus B which lays the plastic in folds upon the supporting table 11.

The roll 33a is carried by a shaft 35 (Fig. 5) journaled at its opposite ends in bearings 36 mounted upon horizontal supporting beams 37, while the roll 34 is mounted upon a shaft 38 (Fig. 3) journaled at its opposite ends in bearings 39 also carried by the supporting beams 37. The roll 33a is preferably positively driven and in turn is adapted to drive the roll 34 and also the rolls 16 and 17 in the drying oven through suitable chain and sprocket or other suitable connections. Thus, the shaft 35 of roll 33a has keyed to one end thereof a hub 40 carrying three sprockets 41, 42, and 43. Trained about sprocket 41 is a sprocket chain 44 connected to and driven from a suitable source of power to effect positive rotation of roll 33a. Trained about sprocket 42 is a sprocket chain 45 also trained about sprockets (not shown) associated with the oven rolls 16 and also operatively connected with the oven rolls 17. A third sprocket chain 46 is trained about sprocket 43 and also about a sprocket 47 carried by a sleeve 48 fixed to the shaft 38 of roll 34.

The folding and laying means B comprises a substantially triangular-shaped festooning device 49 swingably suspended from the roll 34 and having its narrow end pointing downwardly. More specifically, the festooning device 49 comprises a pair of depending arms 50 and 51 loosely mounted at their upper ends upon the shaft 38 of roll 34. Associated with each arm 50 and 51 is a cross beam 52 secured by welding or the like to the upper end of a channel member 53 arranged at substantially right angles to said cross beam to form a T. The channel member 53 and cross beam 52 are secured to the respective arm 50 or 51 by means of a fastening bolt or the like 54 passing through one of the openings 55 in said channel member and also through an opening in said arm.

Secured to the lower end of each channel member 53 is a relatively shorter cross beam 56 arranged parallel with the upper cross beam 52. Extending between and secured to the opposite ends of the upper cross beams 52 are channels 57 and 58 which cooperate with said cross beams to form a substantially rectangular frame, while similar channels 59 and 60 extend between and connect the opposite ends of the lower and shorter cross beam 56 to also form a rectangular frame of the same length but relatively narrower than the upper frame. Extending between and secured to the channels 57 and 59 is a metal plate 61, while a similar metal plate 62 extends between and is secured to the channels 58 and 60. The metal plates 61 and 62 converge downwardly to provide a relatively narrow slot therebetween at the lower end of the festooning device 49. After the plastic sheeting 10 passes horizontally over the roll 34 it is directed downwardly between the metal plates 61 and 62 and upon swinging of the festooning device backwardly and forwardly the plastic sheeting will be laid in loose horizontal folds 12 upon the support 11.

The festooning device 49 is adapted to be swung first in one direction and then the other as indicated by the arrows in Fig. 1 by means of a rotary crank 63 comprising a horizontal shaft 64 (Fig. 4) journaled in a bearing 65 carried by a bracket 66; said bracket being secured to a vertical standard 67 by bolts or the like 68 passing through openings 69 in said standard. Mounted upon one end of the shaft 64 is a sprocket 70, while keyed to the opposite end of said shaft is a plate 71 to which is secured one end of a crank arm 72 by means of screws or the like 73. Pivoted to the outer end of the crank arm 72 as at 74 is one end of a horizontal connecting rod 75 pivotally attached at its opposite end to one of the channel members 53 by a bolt or the like 76 (Fig. 3) passing through one of the openings 77 in said channel member.

Upon driving of the sprocket 70 to rotate shaft 64, the plate 71 will be rotated to effect horizontal reciprocation of the connecting rod 75 and the swinging of the festooning device 49 backwardly and forwardly from its full line position shown in Fig. 2 to its broken line position. Simultaneous with the swinging of the festooning device, the plastic sheeting 10 will be fed downwardly between the metal plates 61 and 62. Therefore, as the device swings backwardly and forwardly, the plastic sheeting will engage first the lower end of plate 61 and then the lower end of plate 62 causing the sheeting to be laid in folds upon the support 11 as shown in Fig. 1.

The sprocket 70 of crank 63 is driven from the roll 34 through the intermediate sprockets 78 and 79 keyed to a horizontal shaft 80 which is mounted in bearings 81 secured to one of the supporting beams 37. The hub 48 on roll shaft 38 carries a second sprocket 82 and trained about this sprocket and sprocket 78 on shaft 80 is a sprocket chain 83, while trained about the sprockets 70 and 79 is a sprocket chain 84. The length of the arc through which the festooning device 49 is swung can be varied by associating the fastening bolt 76 of connecting arm 75 with the desired opening 77 in channel member 53 and when this is done the bracket 66 carrying rotary crank 63 is correspondingly adjusted vertically upon the standard 67. By regulating the length of arc through which the festooning device is swung, the length of fold of plastic sheeting laid upon the support 11 can be controlled. Due to the provision of a plurality of openings 55 in channel members 53, the said channel members and associated parts can be adjusted bodily upwardly or downwardly with respect to the supporting arms 50 and 51.

In Fig. 6 is illustrated a modified type of plastic folding and laying means. The festooning device is herein designated in its entirety by the numeral 85 and comprises spaced parallel depending arms 86 in the form of metal strips swingably carried at their upper ends upon the shaft 38 of roll 34. Extending between and carried by the arms 86 are the pairs of spaced horizontal guide rods 87, 88, and 89 between which the plastic sheeting 10 passes downwardly in substantially the same manner as in the festooning device 49 above described.

The means for actuating the festooning device 85, or in other words swinging it backwardly and forwardly to effect the folding and laying of the plastic sheeting 10 upon the support 11, comprises a rotary cam 90 fixed to a horizontal shaft 91 journaled in bearings 92 carried by the supporting beam 37. The cam 90 is substantially heart-shaped and has associated therewith a follower device 93. The follower device 93 comprises a guide member 94 secured to the underside of supporting beam 37 and having a horizontal guideway 95 within which is slidably mounted a follower block 96 carrying at one end a freely rotatable roller 97 engaging the edge of cam 90. Pivoted to the opposite end of the follower block 96 as at 98 is one end of a connecting rod 99 pivoted at its opposite end to a bolt 100 secured within a slot 101 in the respective arm 86. The roller 97 carried by follower block 96 is maintained in engagement with the cam 90 by means of a counterweight 102 carried at one end of a cable 103; said cable being trained over a pulley 104 and secured at its opposite end to the respective arm 86 of the festooning device 85.

The cooperative action of the rotary cam 90 and counterweight 102 serves to effect the swinging movement of the festooning device 85 first in one direction and then the other to effect the desired folding and laying of the plastic sheeting 10 in the manner shown in Fig. 1. Thus, the rotation of cam 90 engaging roller 97 will swing the festooning device 85 outwardly to broken line position while the counterweight 102 will return it to full line position. The cam 90 is so shaped that when the festooning device 85 reaches the end of its swinging movement in either direction it will be caused to dwell momentarily in such position for a sufficient length of time to permit the plastic to be folded upon itself and to settle upon the support before swinging in the opposite direction. This dwell occurs as the roller 97 passes around the pointed or narrow end of the heart-shaped cam 90 and also during engagement of the roller within the depression 105 at the opposite end of the cam. Of course, a certain amount of dwell also takes place with the apparatus illustrated in Figs. 1 to 5 inclusive due to the inherent operation of the rotary crank 63 but the provision of the cam 90 as shown in Fig. 6 affords a more positive and accurate control of the length of dwell of the festooning device at the end of its swinging movement in either direction.

The rotary cam 90 is driven from the roll 33a through a suitable chain and sprocket drive or in any other desired manner. Thus, there is provided a sprocket chain 106 trained about a sprocket carried by the roll 33a and also about a sprocket 107 keyed to a shaft 108. Fixed to the shaft 108 is a second sprocket 109 about which is trained a sprocket chain 110 also passing about a sprocket 111 keyed to the shaft 91 carrying cam 90. If desired, a rotary cam 90, counterweight 102 and associated parts can be provided at each side of the festooning device 85 to effect a more uniform swinging movement thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described for folding and laying plastic sheeting, comprising spaced parallel depending arms and spaced horizontal guide members extending between and carried by said arms adjacent the lower ends thereof, means for swingably mounting said depending arms adjacent their upper ends, means for feeding the plastic sheeting downwardly between said horizontal guide members, a rotary cam member mounted to rotate about a horizontal axis, a guide member provided with a horizontal guideway, a follower block slidable within said guideway and having a portion engaging the edge of said cam member, means for pivotally connecting said follower block with said arms, means for rotating said cam member to move said follower block forwardly within said guide member to swing said arms in one direction, and separate means for swinging the said arms in the opposite direction whereby the plastic sheeting will alternately engage the horizontal guide members and be laid in horizontal folds upon a support.

2. In apparatus of the character described for folding and laying plastic sheeting, comprising spaced parallel depending arms and spaced horizontal guide members extending between and carried by said arms adjacent the lower ends thereof, means for swingably mounting said depending arms adjacent their upper ends, means for feeding the plastic sheeting downwardly between said horizontal guide members, a rotary, substantially heart-shaped cam member mounted to rotate about a horizontal axis, a guide member provided with a horizontal guideway, a follower block slidable within said guideway and having a portion engaging the edge of said cam member, means for pivotally connecting said follower block with said arms, means for rotating said cam member to move said follower block forwardly within said guide member to swing said arms in one direction, and counterweight means for swinging the said arms in the opposite direction whereby the plastic sheeting will alternately engage the horizontal guide members and be laid in horizontal folds upon a support.

3. Apparatus of the character described for folding and laying plastic sheeting, comprising a dependent frame swingably mounted adjacent its upper end and having spaced horizontal guide portions adjacent its lower end, means for feeding plastic sheeting downwardly between the horizontal guide portions of said frame, a rotary cam member mounted to rotate about a horizontal axis, a guide member provided with a horizontal guideway, a follower block slidable within said guideway and having a portion engaging the edge of said cam member, means for pivotally connecting said follower block with said frame, means for rotating said cam member to move said follower block forwardly within said guide member to swing said frame in one direction, and separate means for swinging the said frame in the opposite direction whereby the plastic sheeting will alternately engage the horizontal guide portions thereof and be laid in horizontal folds upon a support.

4. Apparatus of the character described for folding and laying plastic sheeting, comprising a dependent frame swingably mounted adjacent its upper end and having spaced horizontal guide portions adjacent its lower end, means for feeding plastic sheeting downwardly between the horizontal guide portions of said frame, a rotary, substantially heart-shaped cam member mounted to rotate about a horizontal axis, a guide member provided with a horizontal guideway, a follower block slidable within said guideway and having a portion engaging the edge of said cam member, means for pivotally connecting said follower block with said frame, means for rotating said cam member to move said follower block forwardly within said guide member to swing said frame in one direction, and counterweight means for swinging the said frame in the opposite direction whereby the plastic sheeting will alternately engage the horizontal guide portions thereof and be laid in horizontal folds upon a support.

CARL B. WILLIAMS, Jr.